Patented Dec. 2, 1941

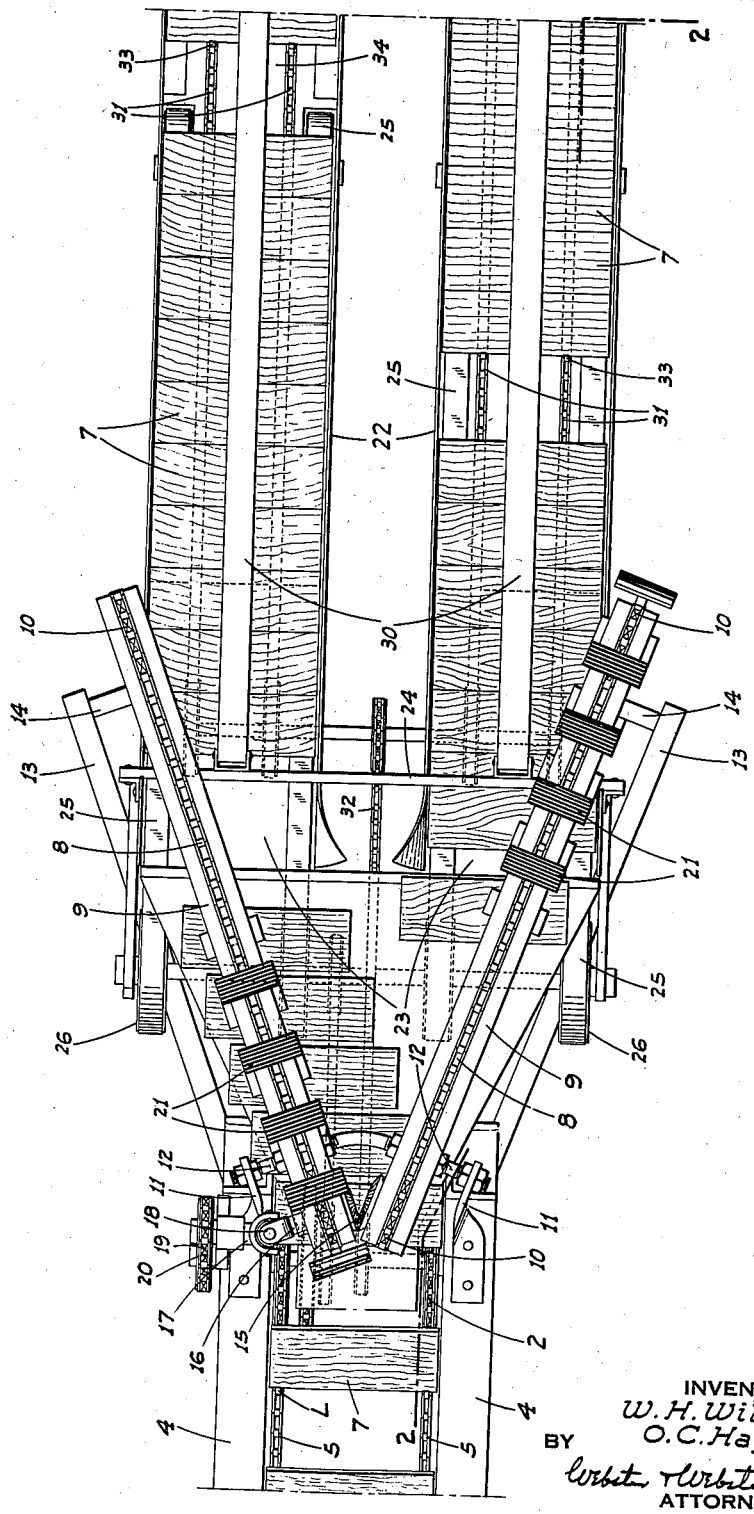

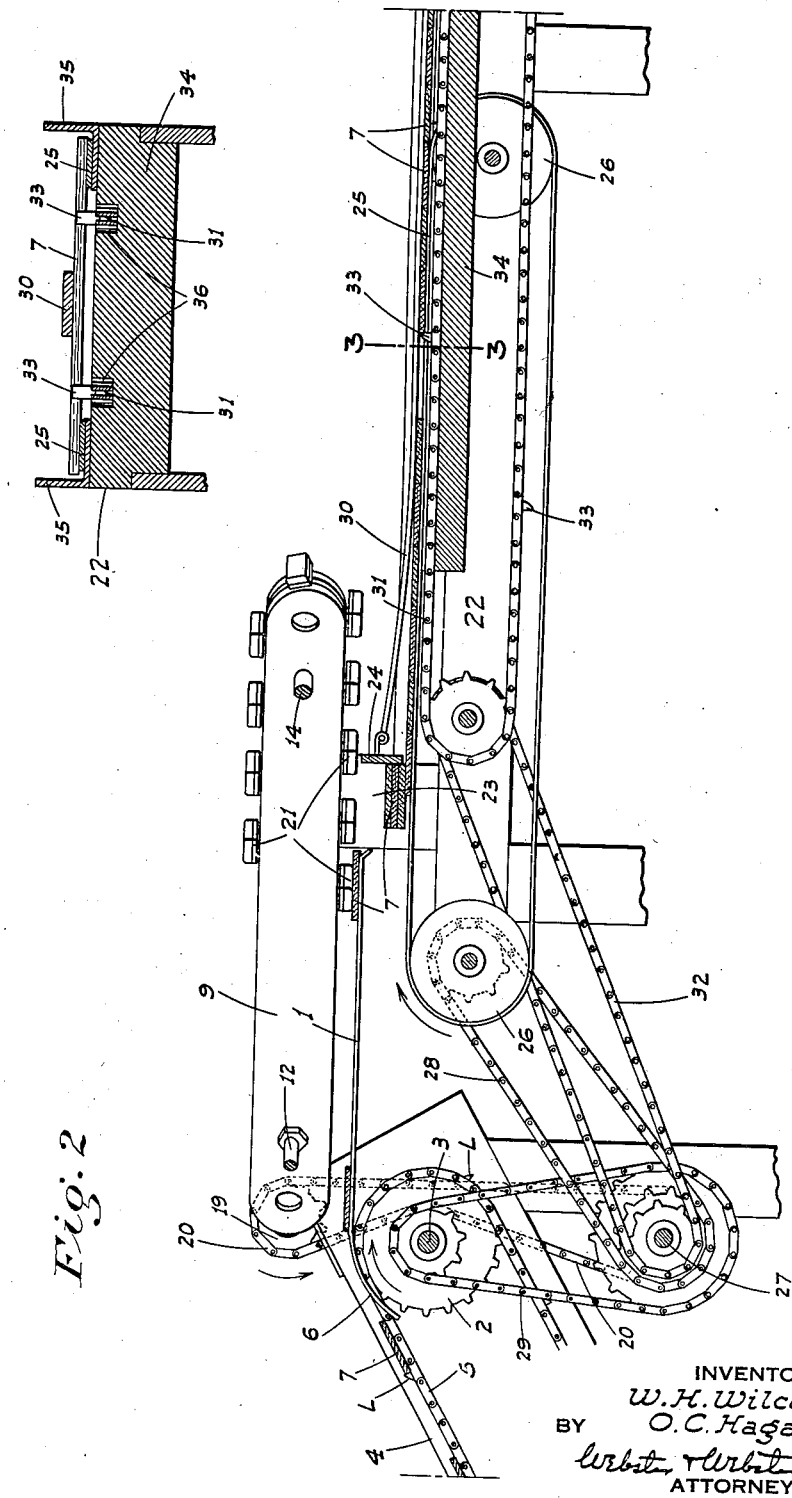

2,264,818

UNITED STATES PATENT OFFICE 2,264,818

ARTICLE DISTRIBUTING MECHANISM

William H. Wilcox and Owen C. Hagan, Stockton, Calif., assignors to California Cedar Products Company, a corporation of California Application April 1, 1940, Serial No. 327,208

12 Claims. (Cl. 198—31)

This invention relates in general to an article distributing mechanism, and in particular the invention is directed to, and it is our principal object to provide, a mechanism adapted to receive articles from a single or one row conveyor and to distribute said articles onto a multiple row conveyor; the articles being distributed in the several rows in predetermined proportion.

Another object of the invention is to provide an article distributing mechanism, of the type described, arranged to distribute the articles into the rows of the multiple row conveyor in spaced groups; each group including a predetermined number of articles disposed in edge to edge or abutting relation.

A further object of the invention is to provide an article distributing mechanism which functions to receive articles from a single row conveyor, to thereafter group the articles into groups of predetermined number, and to alternately deliver said groups to the runs of a two row conveyor.

It is also our object to provide an article distributing mechanism, as above, especially designed for use in connection with the manufacture of wooden pencil slats; the separation of the slats into groups and the placement of the groups in spaced relation in the rows of the multiple row conveyor facilitating inspection and grading of the slats.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Figure 1 is a top plan view of the mechanism.

Figure 2 is a side elevation of the mechanism.

Figure 3 is a cross-section on line 3—3 of Fig. 2.

Referring now more particularly to the characters of reference on the drawings, the mechanism comprises a horizontal table 1 supported in fixed position in suitable manner, and disposed with one end thereof substantially tangent to the upper and spaced sprockets 2 of an upwardly inclined endless conveyor which includes an upper sprocket shaft 3 journaled between side frames 4, and a pair of endless chains 5 engaging said sprockets 2. At said end, the table is formed with a curved deflector plate 6 which projects downward between chains 5 and follows the general curvature of sprockets 2.

Pencil slats 7 are disposed transversely and in longitudinally spaced relation on the upper run of chains 5, and are carried along therewith by means of upstanding lugs L thereon; the chains depositing the slats 7 on table 1 at the adjacent end thereof. Separation of the slats from the chains and movement of the slats onto the table is facilitated by deflector plate 6. From the point of tangency with sprockets 2, hereinafter called the receiving end, table 1 increases in width to its other end, hereinafter called the discharge end.

A pair of horizontal, endless chains 8 are mounted above table 1 in spaced relation thereto; said chains being disposed in adjacent relation at the receiving end of the table and thence diverging from each other toward the other or discharge end of the table beyond which they project some distance. These endless chains 8 are supported in housings 9 which carry the sprockets 10 for said chains; the housings being mounted in position by means which includes brackets 11 and tie bolts 12 at one end of the housings, and supporting arms 13 and tie elements 14 at the other end of the housings. The sprocket shafts for chains 8, at the rear ends thereof, are fitted at adjacent ends with meshing bevel gears 15, while one of said sprocket shafts 16 projects through the outer side of the housing and is driven from a transverse stub shaft 17 through a universal joint 18. Shaft 17 is fitted with a sprocket 19 which is driven from shaft 3 by a reversing chain drive indicated generally at 20.

The housings 9 are split longitudinally, as shown, to expose the chains 8, which are each provided with a plurality of spaced slat engaging resilient pads 21; such pads being connected by suitable elements with the chains and disposed outside the housings transversely thereof. Each chain 8 has a series of the pads 21 which occupy only one half the length of the corresponding chain, and the series of the separate pads are disposed in following order as clearly shown in Fig. 1. The pads in each series are spaced apart from center to center a distance only slightly greater than the width of a pencil slat 7.

While shafts 3 and 17 are driven at the same speed, the speed of the chains 8 is about half that of chains 5 and thus the pencil slats are deposited from their widely spaced relation on chains 5 onto table 1 at the receiving end, each slat being engaged by one of the pads 21 and moved along the table, and also shifted laterally so that said slat moves in a path substantially parallel to the corresponding chain 8.

The series of pads on the chains alternately move rows of slats along the table in diverging relation to each other and to the discharge end of the table; each row including slats equal in number to the number of pads 21 in each series. The angle of divergence between the rows is such that when the slats of each row are discharged from the table, they are disposed in laterally spaced relation and conveyed away by similarly spaced, parallel conveyor units which are indicated generally at 22. These conveyor units 22, which are disposed horizontally, are identical and each comprises the following:

The slats discharged from table 1 fall flat into a hopper 23 which includes an upstanding, transversely extending stop wall 24; the bottom of the hopper being formed by a portion of the upper reach of a relatively short, endless conveyor including transversely spaced endless belts 25. These belts are carried on shaft supported drums 26, a corresponding pair of which are disposed beneath the table 1 and driven from a cross shaft 27 by a suitable endless chain drive indicated generally at 28. Shaft 27 is driven from shaft 3 by endless chain 29; said shaft 27 also supporting the idler sprocket for the lower end of reversing chain drive 20.

The upper reach of belts 25 are spaced below stop wall 24 a distance so that only one slat at a time can pass below said wall. With movement of the belts in the direction indicated by the arrow in Fig. 2, the slats are fed out beneath wall 24 as a row; a flexible drag or friction element 30 being secured on the outside of wall 24 and riding atop the slats as they feed away from said wall. This flexible drag 30 offers sufficient resistance to the advancing movement of the slats to hold them in edge to edge engagement.

Another horizontal conveyor, including transversely spaced, endless chains 31, extends from a point intermediate the ends of conveyor belts 25 to a termination some distance beyond the outer ends thereof; the chains 31 running between said belts with their upper reaches somewhat below those of the belts. Chains 31 are driven from shaft 27 by a suitable endless chain drive indicated generally at 32. Lugs 33 project outwardly from chains 31 at longitudinally spaced points; said lugs being spaced apart a distance greater than the length of each row of slats, and disposed so as to engage the last slat in each row and carry the row away from belts 25. Thus, when disposed on chains 31, the rows of slats are spaced apart a substantial distance while the individual slats in each row are held in edge to edge engagement. The upper reaches of belts 25 and chains 31 are supported by a table 34 which includes facing angle irons 35 which form tracks for said belts, while chains 31 ride in longitudinal grooves 36. It is on the conveyor units, indicated generally at 22, that the slats are inspected and graded; operators or inspectors being seated along said conveyors. The physical segregation according to grade is preferably accomplished by means of apparatus such as that shown in co-pending application Ser. No. 235,476, filed October 17, 1938; the apparatus being suitably arranged in combination with conveyors 22.

The timing of the several conveyors is such that the initially longitudinally spaced slats on chains 5 are moved into adjacent relation on table 1, and after being alternately distributed in rows onto belts 25, are then carried away by chains 31 in longitudinally spaced rows wherein the slats are in edge to edge engagement. While certain chain drives have been shown to accomplish this result, it is obvious that other suitable driving apparatus may be employed.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. In combination, a conveyor adapted to convey articles in a continuous row, a pair of separate conveyors, and an article distributing mechanism interposed between said one conveyor and said pair of conveyors and operatively arranged to receive articles from said one conveyor and to alternately distribute groups of said articles onto the separate conveyors of said pair; said mechanism including an article support, a pair of driven endless chains, each of said chains extending from adjacent said support to adjacent one of said separate conveyors of the pair, and elements on said chains adapted to engage and move articles from said support and discharge the same onto said separate conveyors.

2. In combination, a conveyor adapted to convey articles in a continuous row, a pair of separate conveyors, and an article distributing mechanism interposed between said one conveyor and said pair of conveyors and operatively arranged to receive articles from said one conveyor and to alternately distribute groups of said articles onto the separate conveyors of said pair; said mechanism including an article support, a pair of driven endless chains, each of said chains extending from adjacent said support to adjacent one of said separate conveyors of the pair, and article engaging elements on each of said chains in a series and in a number equal to the number of articles in each group, the series of elements on one chain being disposed in following order relative to the series of elements on the other chain, each series of elements being adapted to engage and move a group of articles from said support and discharge the same onto one of said separate conveyors.

3. In combination, a conveyor adapted to convey articles in a continuous row, a pair of separate conveyors, and an article distributing mechanism interposed between said one conveyor and said pair of conveyors and operatively arranged to receive articles from said one conveyor and to alternately distribute groups of said articles onto the separate conveyors of said pair; said separate conveyors being disposed in spaced relation beyond but with their receiving ends adjacent but spaced from the discharge end of said one conveyor, and said mechanism including an article receiving table disposed between the discharge end of said one conveyor and the receiving ends of said separate conveyors, a pair of driven endless chains disposed above the table, each chain extending across the table from the article receiving portion thereof to adjacent one of said separate conveyors, a series of article engaging elements on each chain, the series of elements on one chain being disposed in following order relative to the series of elements on the other chain, each series of elements being adapted to engage and move a group of articles along the table and discharge the same from the table onto one of said separate conveyors.

4. An article distributing mechanism comprising a table having a receiving end and a discharge end, a pair of driven endless chains disposed parallel to but above the table in diverging relation from the receiving end toward the discharge end, and a series of longitudinally spaced article engaging elements mounted on each chain, each series of elements being adapted to engage a plurality of articles at the receiving end of the table and to move said articles to the discharge end of the table.

5. A mechanism as in claim 4 in which said elements comprise resilient pads; the axis of said chains being parallel to the table, and the pads being disposed in projecting relation to the periphery of said chains.

6. A mechanism as in claim 4 in which the chains are of equal length and the series of elements on each chain occupy one half its length; the series of elements on said chains being arranged in following order.

7. In combination, a conveyor adapted to convey articles in a continuous row, and with the articles relatively widely spaced longitudinally of said conveyor, a separate conveyor an article receiving and distributing mechanism arranged between said conveyors and comprising a support to receive articles from said first named conveyor in said relatively widely spaced relation, and driven means to move said articles into groups on the support and in which groups wherein the articles are disposed relatively close to one another, said means being operative to thereafter discharge group after group of said articles onto said separate conveyor in longitudinally spaced relation thereon.

8. In combination, a conveyor adapted to convey articles in a continuous row, a pair of separate conveyors, and an article distributing mechanism interposed between said one conveyor and said pair of conveyors and operatively arranged to receive articles from said one conveyor and to alternately distribute groups of said articles onto the separate conveyors of said pair; said mechanism including an article support, a pair of endless members mounted adjacent the support, each member corresponding and leading to one of said separate conveyors, and a series of elements on each member to separately engage articles on the support and move the same in groups from the support onto the corresponding one of said separate conveyors, the series on one member engaging a group of articles alternately with the series of the other member.

9. A device as in claim 8 in which the series on one endless member is disposed for movement in following order to the series on the other member; the members being driven at the same speed.

10. An article distributing mechanism comprising a table having a receiving end and a discharge end, a pair of driven members mounted above the table and extending from substantially end to end thereof, and means on each of said members to engage and move articles on the table; said members and means being arranged to move the articles in predetermined number alternately from a common point at said receiving end of the table to spaced points at said discharge end.

11. An article distributing mechanism comprising a table having a receiving end and a discharge end, a pair of endless driven members disposed above the table and extending from substantially end to end thereof in diverging relation, and article engaging elements mounted on said members, said elements being operative to engage articles on the table at a common point at said receiving end and to move said articles in predetermined number alternately to spaced points at said discharge end of the table.

12. An article distributing mechanism comprising a table having an article receiving end and an article discharge end, a conveyor disposed to feed articles in a predetermined direction onto the table adjacent its receiving end, an endless member mounted with one reach thereof overhanging the table, means to drive the member with said reach moving from a point adjacent said receiving end toward said discharge end, a plurality of longitudinally spaced outwardly projecting elements mounted on said endless member and article-engaging friction pads on said elements adapted to initially engage articles adjacent said receiving end and to slide the articles toward said discharge end; the direction of movement of said reach being in diverging relation to the direction of feed of said conveyor whereby the articles as moved by said pads are in laterally offset relation.

WILLIAM H. WILCOX.
OWEN C. HAGAN.